US008830496B2

(12) United States Patent
Itogawa et al.

(10) Patent No.: US 8,830,496 B2
(45) Date of Patent: Sep. 9, 2014

(54) IMAGE RECORDING SYSTEM, IMAGE RECORDING APPARATUS, AND COMPUTER USABLE MEDIUM THEREFOR (75) Inventors: Yoshihiro Itogawa, Mizuho (JP); Noriaki Kishimoto, Aichi-ken (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 205 days.

(21) Appl. No.: 13/434,682

(22) Filed: Mar. 29, 2012

(65) Prior Publication Data
US 2012/0250059 A1 Oct. 4, 2012

(30) Foreign Application Priority Data
Mar. 31, 2011 (JP) ................................. 2011-077842

(51) Int. Cl.
G06F 3/12 (2006.01)
H04N 1/00 (2006.01)
H04B 7/00 (2006.01)
H04N 1/44 (2006.01)
H04N 1/32 (2006.01)

(52) U.S. Cl.
CPC .......... G06F 3/1204 (2013.01); H04N 1/00307 (2013.01); H04N 2201/0039 (2013.01); H04N 1/00771 (2013.01); H04N 1/00697 (2013.01); H04N 2201/0082 (2013.01); H04N 1/00896 (2013.01); H04N 2201/3278 (2013.01); H04N 1/4413 (2013.01); G06F 3/1292 (2013.01); H04N 1/32106 (2013.01); H04N 2201/0036 (2013.01); H04N 2201/0055 (2013.01); G06F 3/1238 (2013.01); H04N 2201/3205 (2013.01); G06F 3/1259 (2013.01); G06F 3/1207 (2013.01); H04N 1/00477 (2013.01)
USPC ....... 358/1.14; 358/1.15; 358/1.13; 358/1.16; 455/41.3; 455/3.06

(58) Field of Classification Search
CPC .............. G06F 3/1292; G06F 3/1236–3/1238; G06F 3/128; G06F 3/1285; G06F 3/1224; G06F 3/1231; G06F 3/1204; G06F 21/608; G03G 15/5075; H04W 52/288; H04W 52/283; H04W 52/285; H04W 4/023; H04W 52/282
USPC ........... 358/1.11–1.18; 455/412.2, 66.1, 41.3, 455/3.06; 380/270
See application file for complete search history.

(56) References Cited

U.S. PATENT DOCUMENTS

2002/0054330 A1* 5/2002 Jinbo et al. .................... 358/1.15
2002/0089694 A1* 7/2002 Idehara ........................ 358/1.15
(Continued)

FOREIGN PATENT DOCUMENTS

JP 2001-245370 A 9/2001
JP 2002-086846 A 3/2002
(Continued)

OTHER PUBLICATIONS

Japan Patent Office, Notification of Reasons for Rejection for Japanese Patent Application No. 2011-077842 (counterpart to above-captioned patent application), mailed on Mar. 12, 2013.

Primary Examiner — Chad Dickerson
(74) Attorney, Agent, or Firm — Baker Botts L.L.P.

(57) ABSTRACT

An image recording system is provided. The image recording system includes an image recording apparatus, a mobile terminal to wirelessly manipulate the image recording apparatus and including a display device, a receiver to receive a signal from one of the image recording apparatus and the mobile terminal, a distance determining unit to determine a distance between the image recording apparatus and the mobile terminal, a range determining unit to determine a range, which includes the detected distance amongst a plurality of continuously incremental ranges partitioned by a predetermined reference distance originating from the image recording apparatus, a storage to store information concerning a plurality of operation screens associated with the plurality of ranges respectively, and a display controller to control the display device to display one of the plurality of operation screens associated with one of the plurality of ranges, which includes the detected distance.

16 Claims, 7 Drawing Sheets

(56) References Cited

U.S. PATENT DOCUMENTS

| | | | |
|---|---|---|---|
| 2002/0169002 A1* | 11/2002 | Imbrie et al. | 455/557 |
| 2003/0027528 A1 | 2/2003 | Hagiwara et al. | |
| 2003/0126039 A1* | 7/2003 | Kiyose et al. | 705/26 |
| 2004/0228639 A1 | 11/2004 | Badovinac et al. | |
| 2005/0287992 A1 | 12/2005 | Hagiwara et al. | |
| 2008/0170256 A1 | 7/2008 | Matsuhara et al. | |
| 2010/0208299 A1* | 8/2010 | Sakuda | 358/1.15 |

FOREIGN PATENT DOCUMENTS

| | | |
|---|---|---|
| JP | 2002-287938 A | 10/2002 |
| JP | 2003-051909 A | 2/2003 |
| JP | 2003-107962 A | 4/2003 |
| JP | 2003-291462 A | 10/2003 |
| JP | 2004-135341 A | 4/2004 |
| JP | 2005-342964 A | 12/2005 |
| JP | 2006-081028 A | 3/2006 |
| JP | 2006-163793 A | 6/2006 |
| JP | 2006-195811 A | 7/2006 |
| JP | 2007-290324 A | 11/2007 |
| JP | 2007290324 A * | 11/2007 |
| JP | 2008-177665 A | 7/2008 |
| JP | 2008-219351 A | 9/2008 |
| JP | 2009-146361 A | 7/2009 |
| JP | 2009146361 A * | 7/2009 |
| JP | 2010-187259 A | 8/2010 |
| WO | 2008-117785 A1 | 10/2008 |

* cited by examiner

IMAGE RECORDING SYSTEM, IMAGE RECORDING APPARATUS, AND COMPUTER USABLE MEDIUM THEREFOR

CROSS REFERENCE TO RELATED APPLICATION

This application claims priority from Japanese Patent Application No. 2011-077842, filed on Mar. 31, 2011, the entire subject matter of which is incorporated herein by reference.

BACKGROUND

1. Technical Field

An aspect of the present invention relates to an image recording apparatus, which can be manipulated by a mobile terminal, an image recording system having the image recording apparatus and the mobile terminal, and a computer usable medium therefor.

2. Related Art

A printing system having a printer, which can be manipulated by a mobile terminal, is known. Further, a printer, which can display a specific operation screen to be used by a user of the mobile terminal for manipulating the printer on a display unit of the mobile terminal, is known. The printer may display the operation screen on the display unit when the mobile terminal approaches the printer, and the user may input an instruction to the printer through the displayed operation screen in the display unit of the mobile terminal.

SUMMARY

According to such a printer, the user can only enter, through the displayed operation screen, an instruction amongst options which are presented in the displayed operation screen. If the user wishes to enter other instructions which are not included in the displayed operation screen, the user is required to switch operation screens on the display unit in order to reach a desired operation screen including the desired option; however, handling the mobile terminal to switch the operation screens may be difficult or cumbersome.

In view of the difficulty, the present invention is advantageous in that an image recording apparatus, which can effectively display a desirable operation screen to the user in the display unit of the mobile terminal, is provided. Further, an image recording system having the image recording apparatus and the mobile terminal, and a computer usable medium therefore, are provided.

According to an aspect of the present invention, an image recording system is provided. The image recording system includes an image recording apparatus configured to record an image on a recording medium, a mobile terminal configured to wirelessly manipulate the image recording apparatus and include a display device, a receiver configured to receive a signal wirelessly transmitted from one of the image recording apparatus and the mobile terminal, a distance determining unit configured to determine a distance between the image recording apparatus and the mobile terminal based on the signal received by the receiver, a range determining unit configured to determine a range, which includes the distance between the image recording apparatus and the mobile terminal, amongst a plurality of continuously incremental ranges partitioned by a predetermined reference distance originating from the image recording apparatus, a storage configured to store information concerning a plurality of operation screens, each of which is associated with one of the plurality of ranges, and a display controller configured to control the display device to display one of the plurality of operation screens associated with one of the plurality of ranges, which includes the distance between the image recording apparatus and the mobile terminal.

According to another aspect of the present invention, an image recording apparatus is provided. The image recording apparatus includes an image recording unit configured to record an image on a recording medium, a communication unit configured to wirelessly communicate with a mobile terminal having a display device and receive a signal wirelessly transmitted from the mobile terminal, a storage configured to store information concerning a plurality of operation screens, each of which is associated with one of a plurality of continuously incremental ranges partitioned by a predetermined reference distance originating from the image recording apparatus, and a controller configured to determine a distance between the image recording apparatus and the mobile terminal based on the signal received by the receiver; determine a range, which includes the distance between the image recording apparatus and the mobile terminal, amongst the plurality of ranges; and transmit the information concerning one of the plurality of operation screens associated with one of the plurality of ranges, which includes the distance between the image recording apparatus and the mobile terminal, to the mobile terminal.

According to another aspect of the present invention, a non-transitory computer usable medium is provided. the computer usable medium contains computer readable instructions executable by a processor of an image recording apparatus, which is configured to record an image on a recording medium and to wirelessly communicate with a mobile terminal to receive a signal transmitted from the mobile terminal and includes a storage configured to store information concerning a plurality of operation screens. Each of the plurality of operation screens is associated with one of a plurality of continuously incremental ranges partitioned by a predetermined reference distance originating from the image recording apparatus. The computer readable instructions cause the processor to execute functions, including determining a distance between the image recording apparatus and the mobile terminal based on the signal received by the receiver; determining a range, which includes the distance between the image recording apparatus and the mobile terminal, amongst the plurality of ranges; transmitting the information concerning one of the plurality of operation screens associated with one of the plurality of ranges, which includes the distance between the image recording apparatus and the mobile terminal.

According to another aspect of the present invention, an image recording system is provided. The image recording system includes an image recording apparatus configured to record an image on a recording medium, a mobile terminal configured to wirelessly manipulate the image recording apparatus and include a display device, a receiver configured to receive a signal wirelessly transmitted from one of the image recording apparatus and the mobile terminal, a distance determining unit configured to determine a distance between the image recording apparatus and the mobile terminal based on the signal received by the receiver, a range determining unit configured to determine a range, which includes the distance between the image recording apparatus and the mobile terminal, amongst a plurality of continuously incremental ranges partitioned by predetermined reference distances originating from the image recording apparatus, a storage configured to store information concerning a plurality of operation screens, each of which is associated with one of the plurality of ranges based on usability of the operation screen, the usability depending on the distance between the image recording apparatus and the mobile terminal, and a display controller configured to control the display device to display one of the plurality of operation screens associated with the one of the plurality of ranges, which includes the distance between the image recording apparatus and the mobile terminal, preferentially over the remaining of the plurality of operation screens.

According to another aspect of the present invention, an image recording system is provided. The image recording system includes an image recording apparatus configured to record an image on a recording medium, a mobile terminal configured to wirelessly manipulate the image recording apparatus and include a display device. The mobile terminal includes a receiver configured to receive a signal wirelessly transmitted from the image recording apparatus, a storage configured to store information concerning a plurality of operation screens, each of which is associated with one of a plurality of continuously incremental ranges partitioned by a predetermined reference distance originating from the image recording apparatus, and a controller configured to determine a distance between the image recording apparatus and the mobile terminal based on the signal received by the receiver; determine a range, which includes the distance between the image recording apparatus and the mobile terminal, amongst the plurality of ranges; and control the display device to display one of the plurality of operation screens associated with one of the plurality of ranges, which includes the distance between the image recording apparatus and the mobile terminal.

DETAILED DESCRIPTION

Hereinafter, embodiments of the present invention will be described with reference to the accompanying drawings. Firstly, a printing system 70 according to a first embodiment will be described with reference to FIGS. 1-6.

Figure 1:
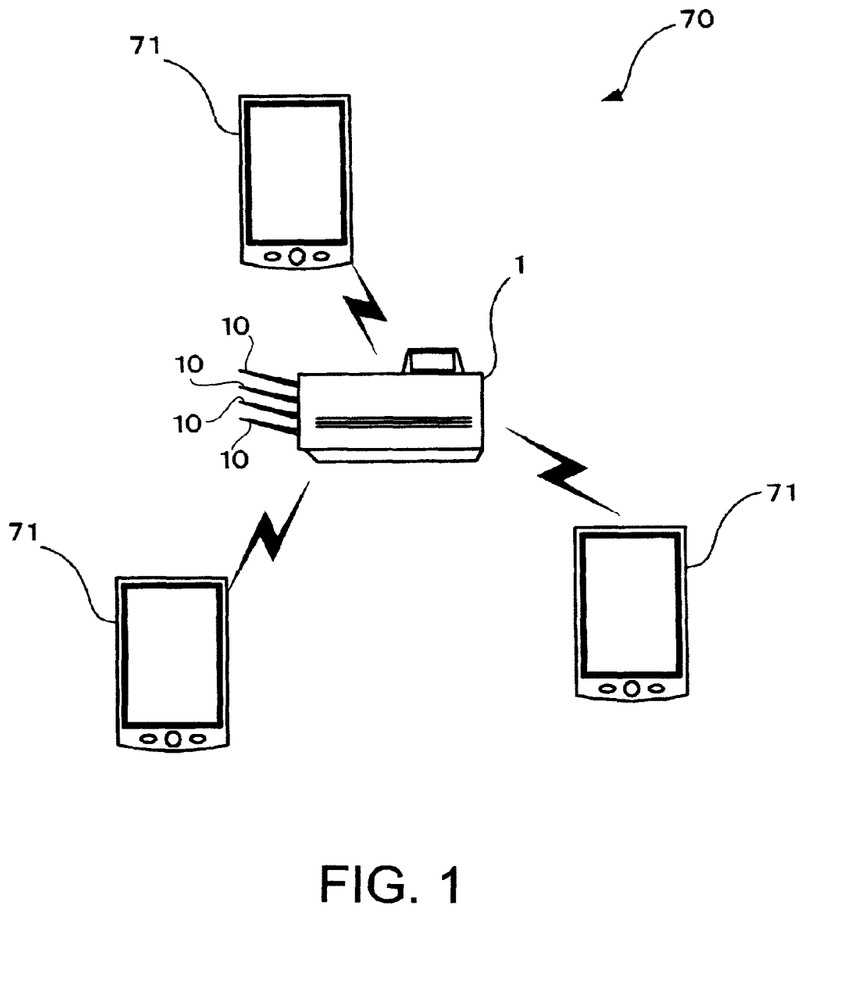
FIG. 1 is schematic diagram to illustrate a printing system according to a first embodiment of the present invention.

As shown in FIG. 1, the printing system 70 includes a printer 1 and a plurality of mobile terminals 71. The printer 1 and the mobile terminals 71 can wirelessly communicate with each other via a wireless LAN (local area network). Users of the mobile terminals 71 can enter instructions and information concerning the printer 1 through the mobile terminal 71.

Figure 2:
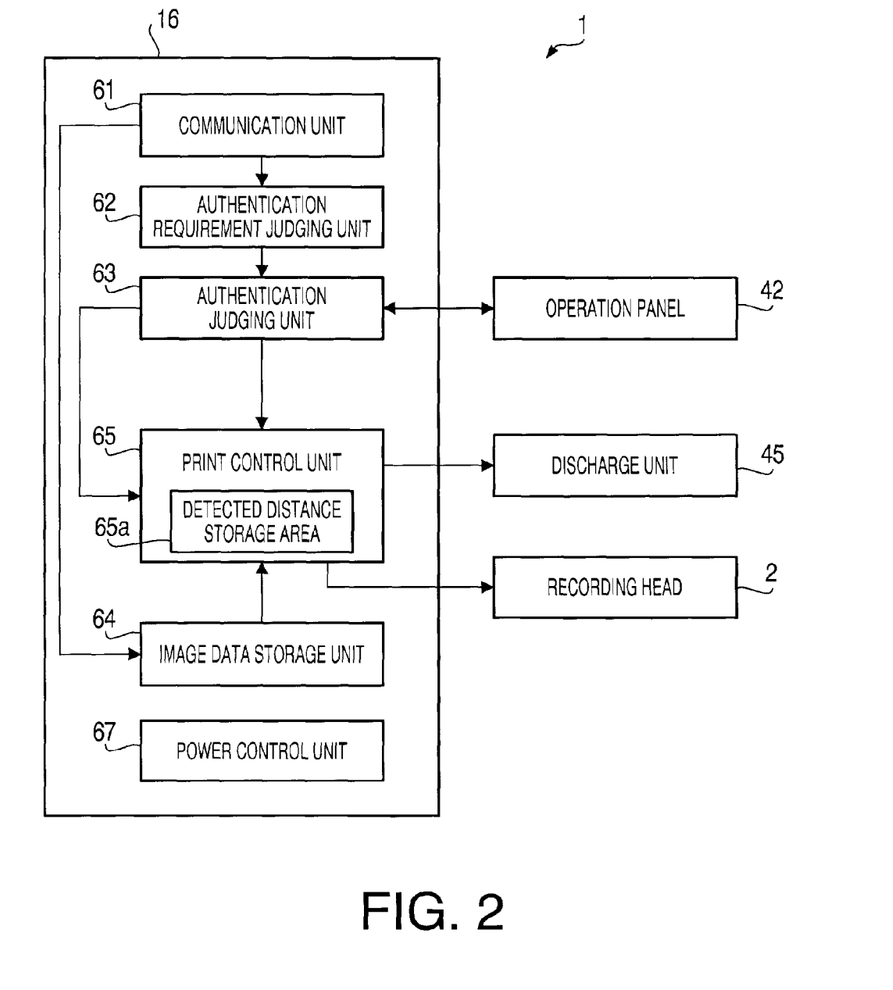
FIG. 2 is a block diagram to illustrate a functional configuration of a printer according to the first embodiment of the present invention.

As shown in FIG. 2, the printer 1 includes a recording head 2, a discharge unit 45, an operation panel 42, and a control unit 16. The recording head 2 can record an image on a recording sheet (not shown). The discharge unit 45 includes a plurality of (e.g., four) discharge trays 10, in which the recording sheet with the image recorded thereon is discharged. The discharge unit 45 further includes a sheet sensor (not shown), which can detect the recording sheet remaining in the discharge trays 10. The operation panel 42 includes a touch-sensitive display unit (unsigned). The control unit 16 controls behaviors of these components.

The control unit 16 includes a CPU (central processing unit), a non-volatile memory, and a RAM (random access memory), which are not shown. The CPU executes programs stored in the non-volatile memory. The non-volatile memory is a rewritable memory device to store the programs and data to be used by the CPU executing the programs. The RAM temporarily stores data whilst the programs are executed by the CPU. The control unit 16 includes functional units including a communication unit 61, an authentication requirement judging unit 62, an authentication judging unit 63, an image data storage unit 64, a print control unit 65, and a power control unit 67. The functions of the control unit 16 may be achieved by executing the programs in cooperation with the functional units shown in FIG. 2.

The communication unit 61 is capable of communicating wirelessly with the mobile terminal 71 via the wireless LAN to exchange data. According to the present embodiment, the communication unit 61 can receive a print instruction from the mobile terminal 71. The print instruction includes image data concerning an image to be printed in the printer 1 and data, which indicates a print mode for the image data. The print mode includes secure printing and regular printing. The secure printing is a printing operation, in which, once the user of the mobile terminal 71 enters the print instruction from the mobile terminal 71, the image is printed after the user enters identifying information through the operation panel 42 of the printer 1 or the mobile terminal 71. In other words, when the print instruction indicates that the image data is to be printed in the secure printing mode, the image is not printed until the user enters the identifying information. Therefore, the image can be printed whilst the user monitors the printing operation by the printer 1, and confidentiality of the printed image can be secured. The regular printing is a printing operation, in which the image is printed immediately after receipt of the print instruction from the mobile terminal 71 without waiting for the user's identifying information.

The authentication requirement judging unit 62 judges, when the communication unit 61 receives the print instruction, whether the print instruction requires secure printing or regular printing. The judgment may be made with reference to, for example, indication data (e.g. a flag indicating the print mode, authentication information such as a password, etc.) associated with the image data and a format of the image data.

The authentication judging unit 63 judges, in the secure printing operation, whether user's identifying information entered by the user through the operation panel 42 or the mobile terminal 71 matches authentication information being associated with the image data. When the user's identifying information entered by the user is identical to the authentication information being associated with the image data, the user is authenticated. The authentication associated with the image data may include, for example, the password received along with the image data in the print instruction and user information stored in the printer 1. The user's identifying information may be stored in a memory medium, such as a memory card, and may be read by a reader device connected with the printer 1 to be entered.

The image data storage unit 64 stores the image data included in the print instruction, which is received by the communication unit 61 from the mobile terminal 71.

The print control unit 65 controls the recording head 2 to record the image on the recording sheet in the secure printing mode when the authentication requirement judging unit 62 judges that the print instruction received by the communication unit 61 requires secure printing. Additionally or alternatively, the print control unit 65 controls the recording head 2 to record the image on the recording sheet in the regular printing mode when the authentication requirement judging unit 62 judges that the print instruction received by the communication unit 61 does not require secure printing. Further, the print control unit 65 includes a detected distance storage area 65a, in which information concerning a distance between the printer 1 and the mobile terminal 71 detected by the mobile terminal 71 is stored. The distance between the printer 1 and the mobile terminal 71 to be detected by the mobile terminal 71 will be described later in detail. The print control unit 65 controls the recording head 2 to record the images in a specific order with reference to the information stored in the detected storage area 65a. More specifically, when the printer 1 receives print instructions requiring regular printing from a plurality of mobile terminals 71, the print control unit 65 refers to the detected distance storage area 65a to determine closeness of the mobile terminals 71 from the printer 1 and executes the regular printing operations to record the images in an order of the closeness of the mobile terminals 71. That is, the image for a mobile terminal 71, which is in a closer distance, is recorded earlier than the images for the mobile terminals 71, which are in further distances. The print control unit 65 controls the discharge unit 45 to discharge the recording sheet with the image recorded thereon in one of the four discharge trays 10 and manipulates the operation panel 42 to display an image indicating the one of the trays 10, in which the discharged recording sheet is disposed, in order for the user to recognize the tray 10 containing the discharged recording sheet.

The power control unit 67 switches power modes of the printer 1 from an active mode being a regular power mode to a sleep mode being a power-saving mode, and vice versa. In the active mode, the printer 1 can execute the printing operation, and in the sleep mode, a part of the printer 1 is restricted from being supplied with power in order to reduce consumption of electricity. The printer 1 may be put in the sleep mode after a predetermined time period from last input to the printer 1 and may be awakened from the sleep mode to return to the active mode when input including the user's input through the operation panel 52 or the mobile terminal 71 is detected.

The mobile terminal 71 includes a CPU, a non-volatile memory, and a RAM, which are not shown. The CPU executes programs stored in the non-volatile memory. The non-volatile memory is a rewritable memory device to store the programs and data to be used by the CPU executing the programs. The RAM temporarily stores data whilst the programs are executed by the CPU. The mobile terminal 71 includes functional units including a communication unit 72, a distance detector unit 73, a control unit 74, an operation panel 75, and a screen storage unit 76. The functions of the mobile terminal 71 may be achieved by executing the programs in cooperation with the functional units shown in FIG. 3.

Figure 3:
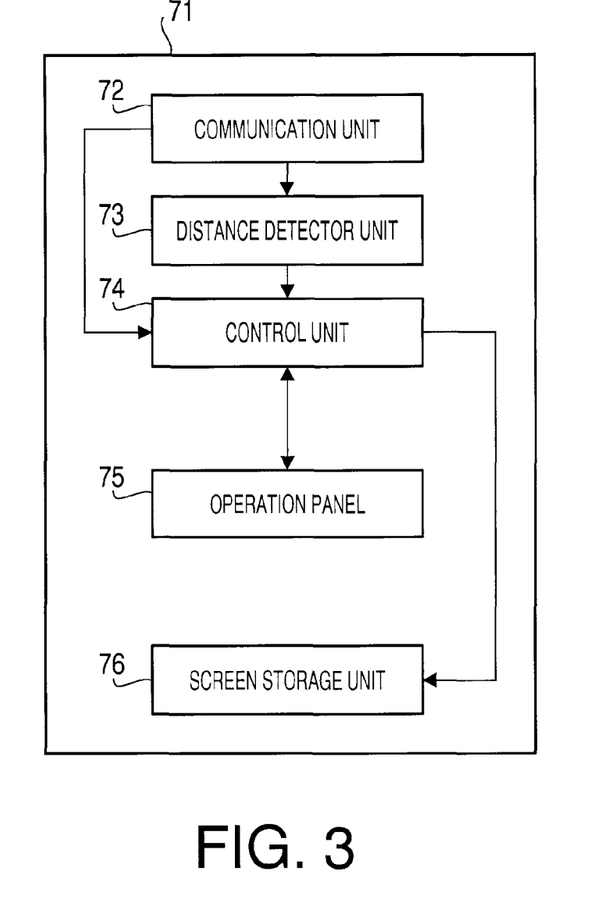
FIG. 3 is a block diagram to illustrate a functional configuration of a mobile terminal according to the first embodiment of the present invention.

The communication unit 72 is capable of communicating wirelessly with the printer 1 through the wireless LAN to exchange data.

The distance detector unit 73 detects, when the communication unit 72 receives wirelessly transmitted signals from the printer 1, distance between the mobile terminal 71 and the printer 1 based on intensity of the signals received in the communication unit 72. More specifically, each time the communication unit 61 of the printer 1 receives signals wirelessly transmitted from the mobile terminal 71, the communication unit 61 returns predetermined signals wirelessly to the mobile terminal 71. In particular, the distance detector unit 73 manipulates the communication unit 72 to transmit the signal to the printer 1 at a predetermined interval and to receive the signals returned from the printer 1. Thus, based on analysis of the signals received from the printer 1, the distance between the printer 1 and the mobile terminal 72 is detected at the predetermined interval. The distance detector unit 73 further manipulates the communication unit 72 to transmit information concerning the detected distance to the printer 1. The printer 1 receiving the information concerning the distance stores the information in the detected distance storage area 65a. When a plurality of mobile terminals 71 are in a communication range for the printer 1, a plurality of distances between the printer 1 and the mobile terminals 71 respectively are collected in the detected distance storage area 65a.

The operation panel 75 includes a touch-sensitive panel with a display, which serves as an interface between the mobile terminal 71 and the user.

The screen storage unit 76 stores information concerning operation screens to be displayed on the operation panel 75. The displayable operation screens contain images and information to be presented to the user, and the user may enter information concerning the print instruction through the operation screens displayed on the operation panel 75. The operation screens include user interface (UI) screens for print instruction, for authentication, for discharge tray, for administrator, and for settings. Through the UI screen for print instruction, the user can enter the print instruction to the printer 1. Through the UI screen for authentication, the user can enter the identifying information to be authenticated for secure printing. Through the UI screen for discharge tray, the discharge tray 10 containing the recording sheet with the recorded image for the print instruction is indicated. Through the UI screen for administrator, a registered administrator can enter administrative operations to the printer 1. And through the UI screen for settings, the user can enter information for settings concerning the printer 1. The UI screens are associated with one of ranges, including a close range and a far range, which are two adjoining ranges, within a total communication range for the printer 1. The close range and the far range are partitioned by a predetermined reference distance originating from the printer 1. The close range includes a shortest assumable distance between the printer 1 and the mobile terminal 71. The adjoining ranges in the total communication range may not necessarily be two ranges but may include intermediate ranges in between the close range and the far range as long as the plurality of ranges are partitioned by the references distances originating from the printer 1 and are continuously incremental to adjoin one another. According to the present embodiment, the UI screen for print instruction is associated with the far range, and the UI screens for authentication, discharge tray, administrator, and settings are associated with the close range.

The control unit 74 controls the mobile terminal as a whole. When an operation screen concerning the printer 1 is called to be displayed by the user, the control unit 74 judges whether the mobile terminal 71 is in the close range or the far range from the printer 1 based on the distance detected by the distance detector unit 73 and with reference to the reference distance. In particular, the control unit 74 examines the distance detected by the distance detector unit 73 and stored in the detected distance storage area 65a and judges whether the detected distance falls within the close range. When the detected distance falls within the close range, it is determined that the mobile terminal 71 is in the close range. When it is determined that the mobile terminal 71 is in the close range, the control unit 74 selectively controls the operation panel 75 to display one of the four UI screens associated with the close range. When it is determined that the mobile terminal 71 is in the far range, the control unit 74 controls the operation panel 75 to display the UI screen for print instruction. The four UI screens to be specifically displayed in association with the close range will be described later in detail.

Figure 4:
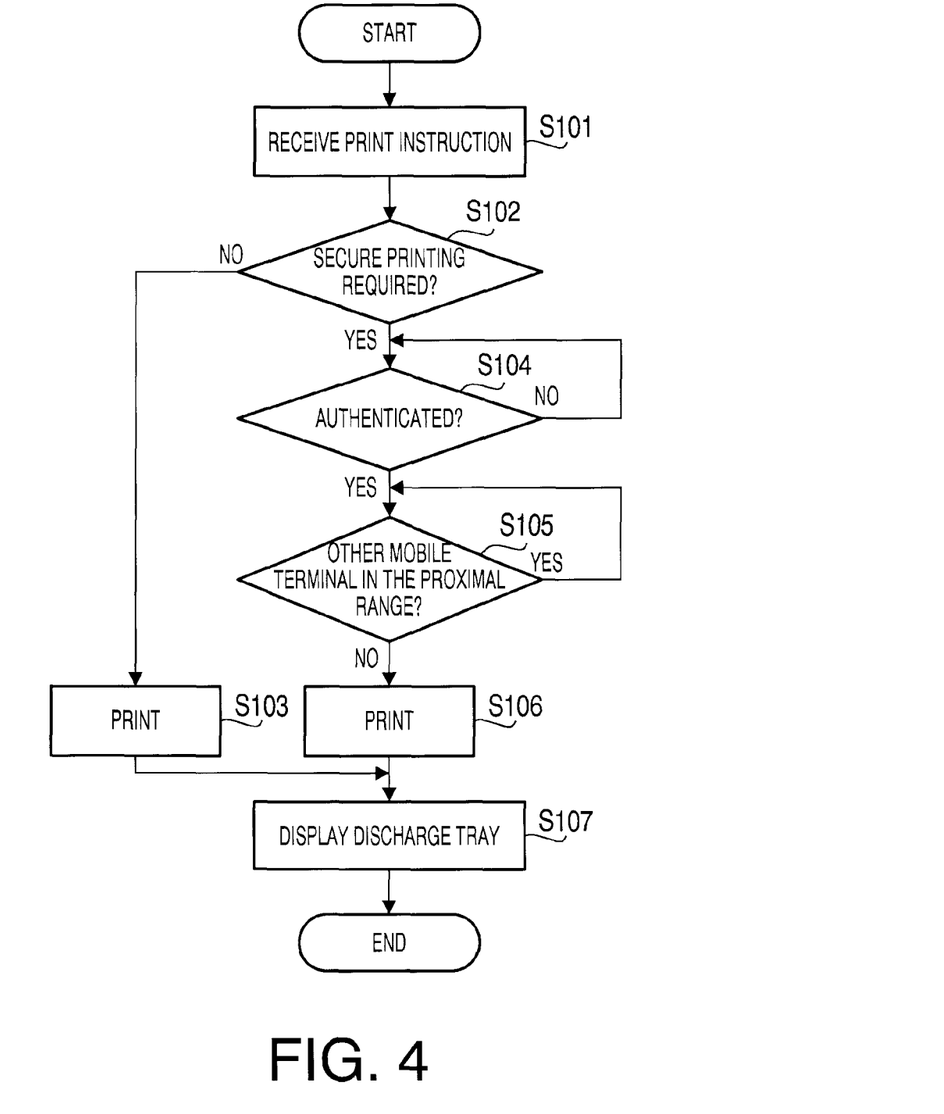
FIG. 4 is a flowchart to illustrate an operational flow of the printer according to the first embodiment of the present invention.

Behaviors of the printer 1 in a printing operation will be described with reference to FIG. 4. When the print instruction is transmitted from the mobile terminal 71, in S101, the communication unit 61 receives the print instruction. The image data included in the received print instruction is stored in the image data storage unit 64. In S102, the authentication requirement judging unit 62 judges whether the print instruction requires secure printing. If the print instruction does not require secure printing (S102: NO), in S103, the print controller unit 65 manipulates the recording head 2 to record the image on the recording sheet according to the image data included in the print instruction. Further, the print control unit 65 manipulates the discharge unit 45 to discharge the recording sheet with the recorded image in one of the discharge trays 10.

If the print instruction requires secure printing (S102: YES), and when user's identifying information is entered through one of the operation panel 42 and the operation panel 75 of the mobile terminal 71, in S104, the authentication judging unit 63 judges whether the user's identifying information meets a predetermined condition. More specifically, it is examined whether the user's identifying information matches the authentication information associated with the image data. If the user's identifying information does not match the authentication information associated with the image data (S104: NO), the authentication judging unit 63 waits until the user enters identifying information that matches the authentication information associated with the image data. If the matching identifying information is entered (S104: YES), in S105, the print control unit 65 refers to the detected distances received by the communication unit 61 from the mobile terminals 71 and judges whether a different mobile terminal 71 is found in the close range for the printer 1. If a different mobile terminal 71 is found in the close range (S105: YES), the print control unit 65 waits until the different mobile terminal 71 is no longer found in the close range. If no different mobile terminal 71 is found in the close range (S105: NO), in S106, the print control unit 65 manipulates the recording head 2 to print the image according to the image data included in the print instruction and manipulates the discharge unit 45 to discharge the recording sheet with the image recorded thereon in one of the discharge trays 10. In S107, the print control unit 65 manipulates the operation panel 42 to indicate the discharge tray 10 containing the discharged recording sheet. The flow ends thereafter.

Figure 5:
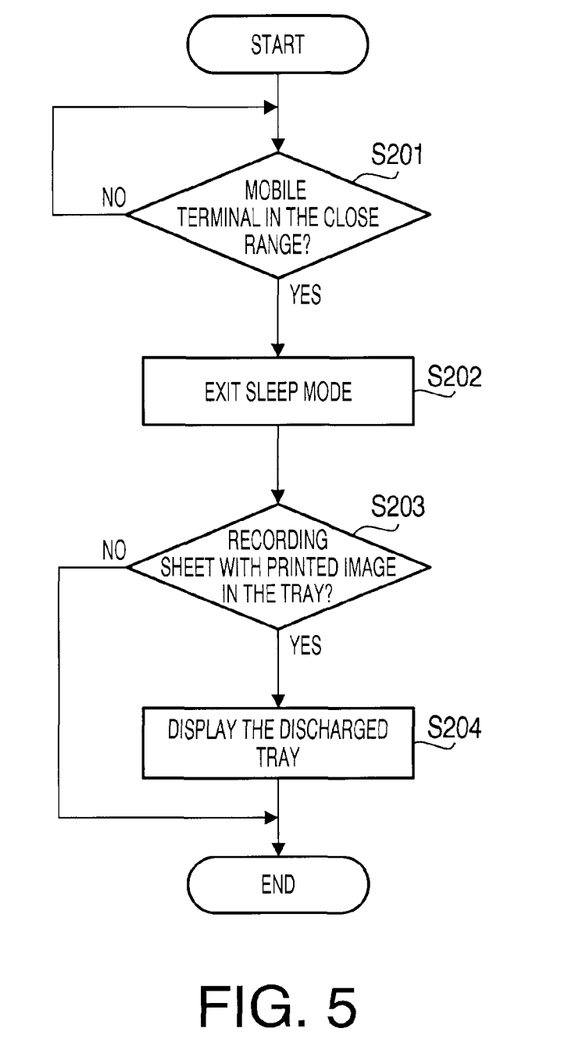
FIG. 5 is a flowchart to illustrate an operational flow of the printer according to the first embodiment of the present invention.

With reference to FIG. 5, behaviors of the printer 1 recovering from the sleep mode to the active mode will be described. When the printer 1 is in the sleep mode, in S201, the print control unit 65 refers to the detected distances received by the communication unit 61 from the mobile terminals 71 and judges whether a mobile terminal 71 is found in the close range for the printer 1. If no mobile terminal 71 is found in the close range (S201: NO), the print control unit 65 waits until a mobile terminal 71 is found in the close range. If a mobile terminal 71 is found in the close range (S201: YES), in S202, the power control unit 67 exits the sleep mode and resumes power supply to the part of the printer 1, which has been prevented from being supplied with the power.

In S203, the print control unit 65 judges whether a recording sheet with an image recorded thereon is in at least one of the discharge trays 10 with reference to a sensed result from the sheet sensor in the discharge unit 45. If a recording sheet is detected in the discharge tray 10 (S203: YES), the print control unit 65 manipulates the operation panel 42 to display an image indicating the discharge tray 10 which contains the recording sheet. If no recording sheet is detected in the discharge trays 10 (S203: NO), the flow ends thereat.

Figure 6:
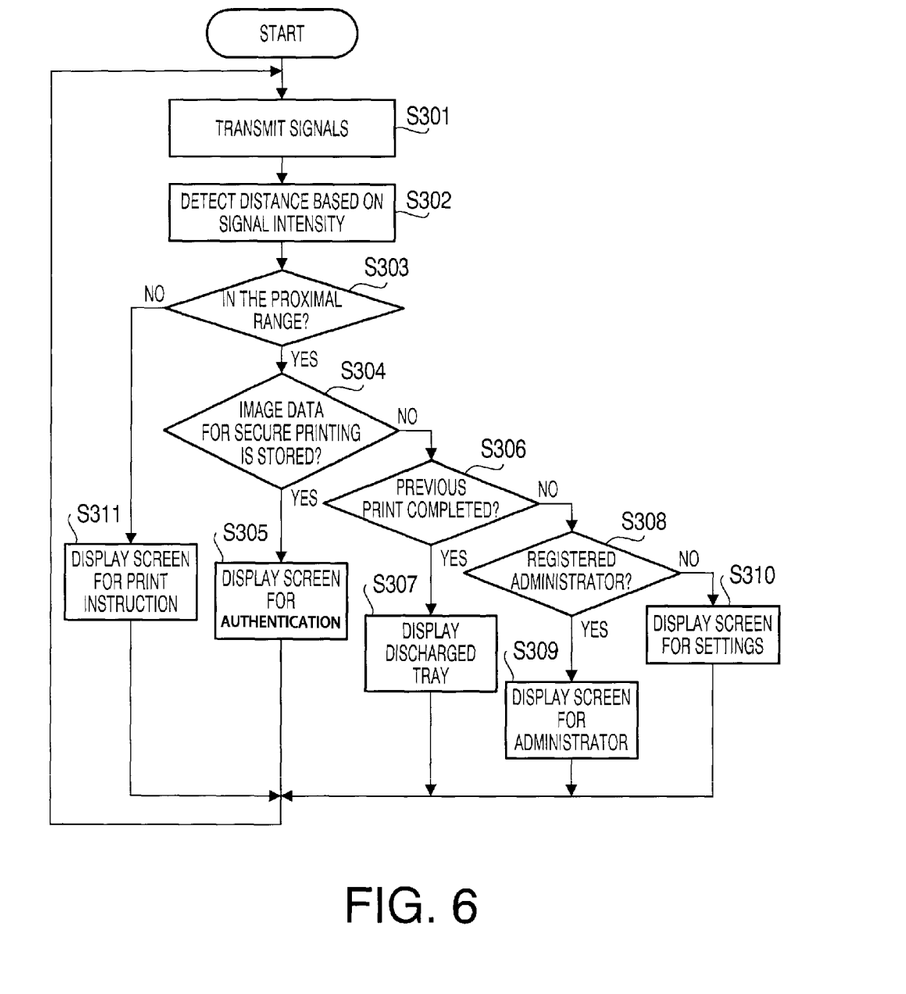
FIG. 6 is a flowchart to illustrate an operational flow of the mobile terminal according to the first embodiment of the present invention.

With reference to FIG. 6, behaviors of the mobile terminal 71 to display the operation screens will be described. In S301, the distance detector unit 73 manipulates the communication unit 72 to transmit the signals to the printer 1. The printer 1 receiving the signals from the mobile terminal 71 transmits return signals to the mobile terminal 71. When the communication unit 72 receives the returned signals, in S302, the distance detector unit 73 detects the distance between the printer 1 and the mobile terminal based on the intensity of the signals received from the printer 1.

In S303, the control unit 74 judges whether the detected distance falls within the close range. If the detected distance falls in the close range (S303: YES), in S304, the control unit 74 judges whether image data from the current mobile terminal 71 requiring secure printing is stored in the image data storage unit 64 of the printer 1. More specifically, the control unit 74 manipulates the communication unit 72 to transmit an inquiry about presence of the print data requiring secure printing, which was transmitted to the printer 1 from the current mobile terminal 71, in the image data storage unit 64 to control unit 16 of the printer 1. The control unit 16 receiving the inquiry examines the image data storage unit 64 to judge whether the image data from the current mobile terminal 71 requiring secure printing is stored and transmits a reply to the inquiry to the control unit 74 of the current mobile terminal 71. If the control unit 74 of the mobile terminal 71 determines that the image data from the current mobile terminal 71 requiring secure printing is stored in the image data storage unit 64 (S304: YES), in S305, the control unit 74 calls the UI screen for authentication, which is associated with the close range, from the screen storage unit 76 and manipulates the operation panel 75 to display the UI screen for authentication. The user viewing the displayed UI screen for authentication can process steps required for the authentication. The flow returns to S301, in which the distance detector unit 73 manipulates the communication unit 72 to transmit the signals to the printer 1.

In S304, if no image data from the current mobile terminal 71 requiring secure printing is stored in the image data storage unit 64 (S034: NO), in S306, the control unit 74 judges whether a latest print instruction, which was transmitted to the printer 1 most recently, has been completed, and the recording sheet with the image recorded thereon remains in one of the discharge tray 10 uncollected. More specifically, the control unit 74 manipulates the communication unit 72 to transmit signals, to inquire whether the image data in the latest print instruction has been completed, and to inquire about the discharge tray 10 containing the recording sheet with the completed image, to the control unit 16 of the printer 1. The control unit 16 receiving the signals judges whether image printing of the image data included in the inquired latest print instruction has been completed and identifies the discharge tray 10 containing the recording sheet with the completed image. After the judgment, the control unit 16 transmits a reply to the inquiry to the control unit 74 of the mobile terminal 71. The control unit 74 receiving the reply judges whether the latest print instruction has been completed and determines the discharge tray 10 containing the recording sheet with the completed image, if any. Alternatively, the control unit 74 may judge completion of the latest print instruction in a different way. For example, when the control unit 74 recognizes that the mobile terminal 71 enters the close range for the first time within a predetermined time period, which is as short as, for example, one minute, after the transmission of the latest print instruction, the control unit 74 may determine that the recording sheet with the image recorded thereon remains uncollected in the discharge tray 10. The judgment may be made additionally based on the detected result of the sheet sensor in the discharge unit 45. In S306, if the control unit 74 determines that the image printing for the latest print instruction has been completed (S306: YES), in S307, the control unit 74 calls the UI screen for discharge tray associated with the close range from the screen storage unit 76 and manipulates the operation panel 75 to display the UI screen for discharge tray. The flow returns to S301, in which the distance detector unit 73 manipulates the communication unit 72 to transmit the signals to the printer 1.

In S306, if the control unit 74 does not determine that the image printing for the latest print instruction has been completed (S306: NO), in S308, the control unit 74 judges whether the mobile terminal 74 is registered in the printer 1 as an administrator. More specifically, the control unit 74 manipulates the communication unit 72 to transmit signals to inquire whether the mobile terminal 71 is registered as an administrator's mobile terminal to the control unit 16 of the printer 1. The control unit 16 receiving the signals from the mobile terminal 74 examines the information stored in the non-volatile memory and judges whether the current mobile terminal 71 is registered as an administrator. After the judgment, the control unit 16 transmits a reply to the inquiry to the control unit 74 of the mobile terminal 71. The mobile terminal 71 receiving the reply judges whether the mobile terminal 71 is registered in the printer 1 as an administrator. If the mobile terminal 71 is registered as an administrator (S308: YES), in S309, the control unit 74 calls the UI screen for administrator associated with the close range from the screen storage unit 76 and manipulates the operation panel 75 to display the UI screen for administrator. The user may enter information concerning administration of the printer 1 through the UI screen for administrator. Thereafter, the flow returns to S301, in which the distance detector unit 73 manipulates the communication unit 72 to transmit the signals to the printer 1.

In S308, if the mobile terminal is not registered in the printer 1 as an administrator (S308: NO), in S340, the control unit 74 calls the UI screen for settings associated with the close range from the screen storage unit 76 and manipulates the operation panel 75 to display the UI screen for settings. The user may enter information concerning settings of the printer 1 through the UI screen for settings. Thereafter, the flow returns to S301, in which the distance detector unit 73 manipulates the communication unit 72 to transmit the signals to the printer 1.

In S303, if the control unit 74 determines that the detected distance between the printer 1 and the mobile terminal 71 does not fall in the close range (S303: NO), in S311, the control unit 74 manipulates the operation panel 75 to display the UI screen for print instruction, which is associated with the far range. The user may enter a print instruction to the printer 1 through the UI screen for print instruction. Thereafter, the flow returns to S301, in which the distance detector unit 73 manipulates the communication unit 72 to transmit the signals to the printer 1.

According to the printing system 70 and the flows described above, the operation screens can be displayed depending on the range including the distance between the mobile terminal 71 and the printer 1. Therefore, the operation screen may be effectively presented to the user of the mobile terminal 71.

Moreover, when the user is in the close range, the operation screens specifically associated with the close range can be displayed. Therefore, the operation screen, which is more likely to be desired by the user, may be directly presented to the user without requiring the user to experience additional or intervening switching operations to switch screens.

Further, when the image data requiring secure printing is stored in the image data storage unit 64 of the printer 1 whilst the user is in the close range, the UI screen for authentication is displayed in the operation panel 75; therefore, the user can access the authentication process directly or in a shorter route, and the steps required for authentication can be activated in shorter time.

Furthermore, when the user is in the close range, and if the latest print instruction from the current mobile terminal 71 has been completed, the UI screen for discharge tray is displayed; therefore, the user can be notified of the discharge tray 10 containing the recording sheet with the completed image. Thus, the user can easily recognize which discharge tray 10 to look for to find the recording sheet, and the recording sheet with the printed image can be securely picked up by the user.

On the other hand, when the user is in the far range, the UI screen for print instruction is displayed. In other words, the UI screens associated with the close range are refrained from being displayed. Therefore, the user can be prevented from having to deal with the UI screens, which may not be necessarily for the user in the far range, but the user can be allowed to enter the print instruction in shorter time or in a shorter route without having to going through intermediate screen-switching operations.

Further, the UI screen for administrator can be displayed when the user with the registered mobile terminal 71 is in the close range; therefore, an administrator can access the printer 1 to administrate in shorter time or in a shorter route without having to going through intermediate screen-switching operations.

Moreover, when the user with the mobile terminal 71 enters the close range, the printer 1 in the sleep mode is awakened and activated; therefore, the printer 1 can start printing the image in shorter time.

Furthermore, when the printer 1 is provided with a plurality of print instructions from a plurality of mobile terminals 71, the print instructions can be processed in the order of closeness of the mobile terminals 71 from the printer 1. Therefore, the user in a closer distance from the printer 1 can have the completed image in shorter time.

Figure 7:
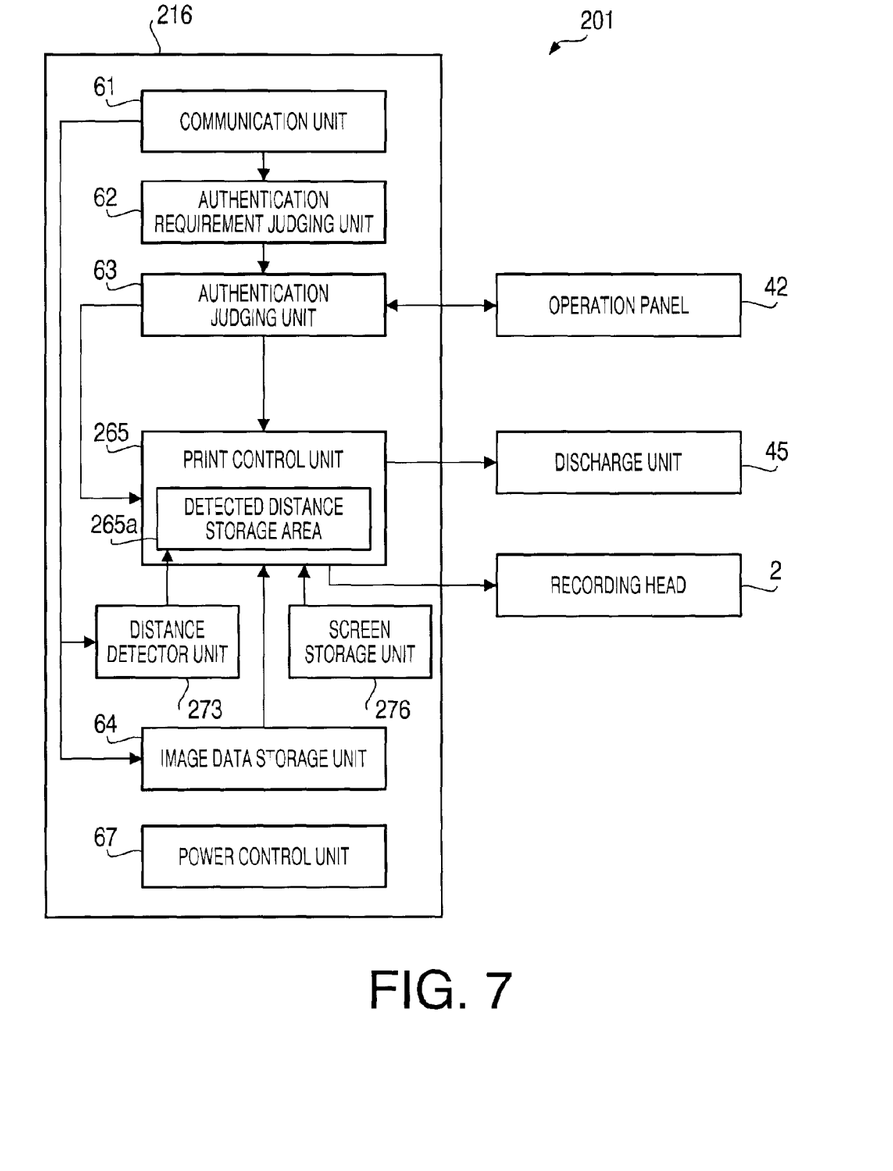
FIG. 7 is a block diagram to illustrate a functional configuration of a printer according to a second embodiment of the present invention.

Next, a second embodiment of the present invention will be described with reference to FIG. 7. In the second embodiment described below, components which are identical or similar to those described in the first embodiment may be referred to by same reference signs, and description of the similar components having been mentioned in the first embodiment will be omitted. As shown in FIG. 7, a control unit 216 in the printer 1 includes the communication unit 61, the authentication requirement judging unit 62, the authentication judging unit 63, the image data storage unit 64, a print control unit 265, the power control unit 67, a distance detector unit 273, and a screen storage unit 276.

The distance detector unit 273 detects, when the communication unit 61 receives wirelessly transmitted signals from the mobile terminal 71, distance between the mobile terminal 71 and the printer 1 based on intensity of the signals received in the communication unit 61. In particular, each time the communication unit 61 of the printer 1 receives signals wirelessly transmitted from the mobile terminal 71, the distance detector unit 273 detects the distance between the printer 1 and the mobile terminal 72 at the predetermined interval based on analysis of the signals received from the mobile terminal 71. The distance detector unit 273 stores information concerning the detected distance in the detected distance storage area 65a. When a plurality of mobile terminals 71 are in the total communication range for the printer 1, a plurality of distances between the printer 1 and the mobile terminals 71 respectively are collected in the detected distance storage area 65a. The information concerning the detected distances is transmitted to the mobile terminals 71 respectively by the control unit 216 via the communication unit 61.

The screen storage unit 276 stores the information concerning operation screens to be displayed on the operation panel 75, similarly to the screen storage unit 76 in the mobile terminal 71 described in the first embodiment. The operation screens include user interface (UI) screens for print instruction, for authentication, for discharge tray, for administrator, and for settings.

The print control unit 265 judges, when the distance detector unit 273 detects the distance between the mobile terminal 71 and the printer 1, whether the mobile terminal 71 is in the close range or in the far range from the printer 1 based on the distance detected by the distance detector unit 273 and with reference to a predetermined reference distance. When it is determined that the mobile terminal 71 is in the close range, the print control unit 265 manipulates the communication unit 61 to transmit the information concerning a specific one of the four UI screens associated with the close range to the mobile terminal 71. When it is determined that the mobile terminal 71 is in the far range, the print control unit 265 manipulates the communication unit 61 to transmit the information concerning the UI screen associated with the far range to the mobile terminal 71. The mobile terminal 71 receiving the information concerning the specific UI screen displays the specified UI screen through the operation panel 75.

According to the printing system 70 in the second embodiment, the operation screens can be displayed depending on the distance between the mobile terminal 71 and the printer 1. Therefore, the operation screen, which is more likely to be desired by the user, may be directly presented to the user without requiring the user to experience additional or intervening switching operations to switch screens.

Although examples of carrying out the invention have been described, those skilled in the art will appreciate that there are numerous variations and permutations of the image recording apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the above-described examples, either one of the mobile terminal 71 and the printer 1 is equipped with the distance detector unit 73/273. However, each of the mobile terminal 71 and the printer 1 may be equipped with the distance detector unit 73, 273, and the mobile terminal 71 and the printer 1 may detect the distance respectively. Moreover, the mobile terminal 71 and the printer 1 may be separately or individually equipped with the distance detector unit 73/273 and the screen storage unit 76/276.

For another example, in the above-described examples, each of the operation screens is associated with either one of the two adjoining ranges, which are the far range and the close range. However, the total communication range for the printer 1 may not necessarily be divided into two. That is, the adjoining ranges may not necessarily be two ranges but may include intermediate ranges in between the close range and the far range as long as the plurality of ranges are partitioned by the references distances originating from the printer 1 and are continuously incremental to adjoin one another within the total communication range for the printer 1. In this configuration with the three or more ranges in the total communication range, a specific one of the four operation screens associated with the above-described close range may be displayed through the operation panel 75 when the mobile terminal 71 is in the closest range within the plurality of partitioned ranges. Moreover, as long as none of the four operation screens associated with the above-described close range is displayed through the operation panel 75 when the mobile terminal 71 is in a furthest range amongst the plurality of ranges within the total communication range, a specific one of the four operation screens associated with the above-described close range may be displayed when the mobile terminal 71 is in a closer range, which includes the closest range and a second closest range adjoining the closest range. Further, the "closer range", in which a specific one of the four operation screens associated with the above-described close range is displayed, may include a third closest range or more as long as the "closer range" includes the closest range, and the ranges included in the closer range are continuously incremental and adjoin one another.

For another example, the operation screens to be displayed through the operation panel 75 of the mobile terminal 71 may not necessarily be entirely displayed but may be displayed to partially appear on the operation panel 75 of the mobile terminal 71. More specifically, a part of an underlying UI screen may be exposed when the UI screen associated with the corresponding range is called. Thus, the user may still manipulate the printer 1 without switching the operation screens. Further, the operation screens to be displayed in association with the ranges may not necessarily be limited to the UI screens for print instruction, for authentication, for discharge tray, for administrator, or for settings, but additional or replacing UI screens may be displayed. Furthermore, the UI screens may be displayed in association with a different range within the plurality of ranges in the total communication range for the printer 1. For example, the UI screen for setting may be associated with the far range in place of the UI screen for print instruction and displayed when the mobile terminal 71 is in the far range. Alternatively, for example, the both UI screens for setting and print instruction may be associated with the far range. That is, at least one of the UI screens for setting and print instruction may be associated with the far range, which is greater than or equivalent to the predetermined reference distance.

For another example, the printer 1 may not necessarily be a single-functioned printer but may be equipped with a copier function in addition to the printing function. When the printer 1 is equipped with the copier function, a UI screen concerning the copier function may be associated with the close range and be displayed through the operation panel 75 of the mobile terminal 71 when the mobile terminal 71 is in the close range.

Whilst a copier is often manipulated directly by the user being in an adjacent position, the user may manipulate the copier to prepare for the copying operation as soon as the user enters the close range, and the copying operation can be started soon after the user arrives at the copier.

In the first embodiment described above, when the printer 1 receives a plurality of print instructions from the mobile terminals 71, the print instructions are processed in the order of closeness of the mobile terminals 71 from the printer 1. However, the plurality of print instructions may not necessarily be processed in the order of closeness but may be, for example, processed in a chronological order, i.e., in the order of receipt of the print instructions.

In the first embodiment described above, when secure printing is required for a print instruction and when a different mobile terminal 71 is found in the close range, the printer 1 waits until the different mobile terminal 71 is no longer found in the close range. However, the print instruction may be processed whilst the different mobile terminal 71 is in the close range. In this regard, the printing system 70 may ask for the user's permission whether the print instruction should be continued or suspended, and the print instruction may be processed when the user confirms that the print instruction should be continued. Although it may be concerned that confidentiality of the printed image is risked, the user may appreciate a faster printing process depending on contents of the recorded image.

In the first and second embodiments described above, the distance between the mobile terminal 71 and the printer 1 are detected based on the intensity of the signals exchanged between the printer 1 and the mobile terminal 71. However, the distance may be detected based on, for example, positions of the mobile terminal 71 and the printer 1 detected by a global positioning system (GPS).

In the above-described embodiment, a single CPU may perform all of the processes. Nevertheless, the disclosure may not be limited to the specific embodiment thereof, and a plurality of CPUs, a special application-specific integrated circuit ("ASIC"), or a combination of a CPU and an ASIC may be used to perform the processes.

The present invention may not necessarily be applied to the printer but may be applied to other image processing apparatus, such as a facsimile machine and a copier.

What is claimed is:

1. An image recording system, comprising:
   an image recording apparatus configured to record an image on a recording medium;
   a mobile terminal configured to wirelessly manipulate the image recording apparatus and include a display device, the mobile terminal at least including a first mobile terminal;
   a receiver configured to receive a signal wirelessly transmitted from one of the image recording apparatus and the mobile terminal;
   a distance determining unit configured to determine a distance between the image recording apparatus and the mobile terminal based on the signal received by the receiver;
   a range determining unit configured to determine a range, which includes the distance between the image recording apparatus and the mobile terminal, amongst a plurality of continuously incremental ranges partitioned by a predetermined reference distance originating from the image recording apparatus;
   a storage configured to store information concerning a plurality of operation screens, each of which is associated with one of the plurality of continuously incremental ranges; and
   a display controller configured to control the display device of the mobile terminal to display one of the plurality of operation screens associated with one of the plurality of continuously incremental ranges, which includes the distance between the image recording apparatus and the mobile terminal,
   wherein the image recording apparatus further comprises:
      a judging unit configured to judge whether image data provided from the mobile terminal requires an authentication process, in which a user accessing the image data is authenticated;
      an authentication unit configured to execute the authentication process when user information entered by the user through the mobile terminal and user information included in the image data are determined to be identical; and
      a record controller, which is configured to control the image recording apparatus to record the image when the judging unit judges that the image data provided from the mobile terminal requires the authentication process and after the user is authenticated in the authentication process, the record controller being configured to control the image recording apparatus to record the image without the authentication of the user when the judging unit judges that the image data provided from the mobile terminal does not require the authentication process;
   wherein, when the judging unit judges that the image data provided from the mobile terminal requires the authentication process, the display controller manipulates the display device of the mobile terminal to display an operation screen for the user to enter the user information through the mobile terminal to present as one of the plurality of operation screens to be displayed when the distance between the image recording apparatus and the mobile terminal falls in a smallest one of the plurality of continuously incremental ranges, which includes a shortest assumable distance between the image recording apparatus and the mobile terminal; and
   wherein, when the receiver receives signals transmitted from a plurality of mobile terminals including the first mobile terminal, and the range determining unit determines the distances between the image recording apparatus and the plurality of mobile terminals including the first mobile terminal fall in the smallest one of the plurality of continuously incremental ranges, the record controller controls the image recording apparatus not to start recording the image for the image data provided from the first mobile terminal until no signal that pertains to a distance that falls within the smallest one of the plurality of continuously incremental ranges from the plurality of mobile terminals, except the first mobile terminal, is received.

2. The image recording system according to claim 1, wherein the image recording apparatus includes a recording head configured to record the image on the recording medium,
   wherein the record controller controls the recording head to record the image on the recording medium.

3. The image recording system according to claim 1, wherein the image recording apparatus includes a plurality of discharge trays, in which the recording medium with the recorded image is discharged; and wherein the display controller manipulates the display device of the mobile terminal to display an operation screen indicating one of the discharge trays, in which the recording medium with the image recorded according to the image data provided from the mobile terminal is discharged, to present as the one of the plurality of operation screens to be displayed when the distance between the image recording apparatus and the mobile terminal falls in a smallest one of the plurality of continuously incremental ranges, which includes a shortest assumable distance between the image recording apparatus and the mobile terminal.

4. The image recording system according to claim 1, wherein the image recording apparatus includes a copier unit; and
wherein the display controller manipulates the display device of the mobile terminal to display an operation screen concerning manipulation of the copier unit to present as the one of the plurality of operation screens to be displayed when the distance between the image recording apparatus and the mobile terminal falls in a smallest one of the plurality of continuously incremental ranges, which includes a shortest assumable distance between the image recording apparatus and the mobile terminal.

5. The image recording system according to claim 1, wherein, in the storage, an operation screen for the user to enter at least one of an operation setting and an image recording instruction for the image recording apparatus is stored in association with at least one of the plurality of continuously incremental ranges including a distance which is one of greater than and equivalent to the predetermined reference distance.

6. The image recording system according to claim 1, wherein, when the mobile terminal is registered as an administrator's mobile terminal, the display controller manipulates the display device of the administrator's mobile terminal to display an operation screen concerning administration when the distance between the image recording apparatus and the administrator's mobile terminal is determined to be one of smaller than and equal to a predetermined reference distance.

7. The image reading system according to claim 1, wherein one of the image recording apparatus and the mobile terminal includes the receiver, the distance determining unit, the range determining unit, the storage, and the display controller.

8. The image recording system according to claim 1, wherein the mobile terminal includes the receiver configured to receive the signal wirelessly transmitted from the image recording apparatus, the distance determining unit, the range determining unit, the storage and the display controller.

9. The image reading system according to claim 1, wherein the image recording apparatus includes the receiver configured to receive the signal wirelessly transmitted from the mobile terminal, the distance determining unit, the range determining unit, and the storage; and
wherein the mobile terminal includes the display controller.

10. An image recording apparatus, comprising:
an image recording unit configured to record an image on a recording medium;
a communication unit configured to wirelessly communicate with a mobile terminal, which at least includes a first mobile terminal, having a display device and receive a signal wirelessly transmitted from the mobile terminal;
a storage configured to store information concerning a plurality of operation screens, each of which is associated with one of a plurality of continuously incremental ranges partitioned by a predetermined reference distance originating from the image recording apparatus; and
a controller configured to:
determine a distance between the image recording apparatus and the mobile terminal based on the signal received by the communication unit;
determine a range, which includes the distance between the image recording apparatus and the mobile terminal, amongst the plurality of continuously incremental ranges;
judge whether image data provided from the mobile terminal requires an authentication process, in which a user accessing the image data is authenticated;
transmit the information concerning one of the plurality of operation screens associated with one of the plurality of continuously incremental ranges, which includes the distance between the image recording apparatus and the mobile terminal, to the mobile terminal, the controller transmitting information concerning an operation screen for the user to enter user information through the mobile terminal to present as one of the plurality of operation screens to be displayed when the distance between the image recording apparatus and the mobile terminal is determined to fall in a smallest one of the plurality of continuously incremental ranges, which includes a shortest assumable distance between the image recording apparatus and the mobile terminal;
execute the authentication process when the user information entered by the user through the mobile terminal and user information included in the image data are determined to be identical; and
control the image recording unit to one of record when it is judged that the image data provided from the mobile terminal requires the authentication process and after the user is authenticated in the authentication process and record the image without the authentication of the user when it is judged that the image data provided from the mobile terminal does not require the authentication process,
wherein, when the communication unit receives signals transmitted from a plurality of mobile terminals including the first mobile terminal, and distances between the image recording apparatus and the plurality of mobile terminals including the first mobile terminal are determined to fall in the smallest one of the plurality of continuously incremental ranges, the controller controls the image recording unit not to start recording the image for the image data provided from the first mobile terminal until the communication unit receives no signal that pertains to a distance that falls within the smallest one of the plurality of continuously incremental ranges from the plurality of mobile terminals except the first mobile terminal.

11. The image recording apparatus according to claim 10, wherein the image recording apparatus is operable in one of switchable operation modes including a power-saving mode, in which consumption of electricity reduced, and a regular power mode; and wherein, when the image recording apparatus is in the power-saving mode, and when the range determined by the controller is one of smaller than and equal to a predetermined range, the operation modes are switched from the power-saving mode to the regular power mode.

12. The image recording apparatus according to claim 10, wherein the image recording unit records images for image data provided from the plurality of mobile terminals according to an order determined by closeness of the distances between the image recording apparatus and each of the plurality of mobile terminals.

13. A non-transitory computer usable medium containing computer readable instructions executable by a processor of an image recording apparatus, which is configured to record an image on a recording medium and to wirelessly communicate with a mobile terminal, at least including a first mobile terminal, to receive a signal transmitted from the mobile terminal and includes a storage configured to store information concerning a plurality of operation screens, each of which is associated with one of a plurality of continuously incremental ranges partitioned by a predetermined reference distance originating from the image recording apparatus, the computer readable instructions causing the processor to execute functions, comprising:
   determining a distance between the image recording apparatus and the mobile terminal based on the signal received by the image recording apparatus;
   determining a range, which includes the distance between the image recording apparatus and the mobile terminal, amongst the plurality of continuously incremental ranges;
   judging whether image data provided from the mobile terminal requires an authentication process, in which a user accessing the image data is authenticated;
   transmitting information concerning an operation screen for the user to enter user information through the mobile terminal to present as one of the plurality of operation screens to be displayed when the distance between the image recording apparatus and the mobile terminal is determined to fall in a smallest one of the plurality of continuously incremental ranges, which includes a shortest assumable distance between the image recording apparatus and the mobile terminal;
   executing the authentication process when the user information entered by the user through the mobile terminal and user information included in the image data are determined to be identical; and
   controlling the image recording unit to the one of record when it is judged that the image data provided from the mobile terminal requires the authentication process and after the user is authenticated in the authentication process and record the image without the authentication of the user when it is judged that the image data provided from the mobile terminal does not require the authentication process,
   wherein, when the image recording apparatus receives signals transmitted from a plurality of mobile terminals including the first mobile terminal, and distances between the image recording apparatus and the plurality of mobile terminals including the first mobile terminal are determined to fall in the smallest one of the plurality of continuously incremental ranges, the controller controls the image recording unit not to start recording the image for the image data provided from the first mobile terminal until a communication unit receives no signal that pertains to a distance that falls within the smallest one of the plurality of continuously incremental ranges from the plurality of mobile terminals except the first mobile terminal.

14. An image recording system, comprising:
   an image recording apparatus configured to record an image on a recording medium;
   a mobile terminal configured to wirelessly manipulate the image recording apparatus and include a display device, the mobile terminal at least including a first mobile terminal;
   a receiver configured to receive a signal wirelessly transmitted from one of the image recording apparatus and the mobile terminal;
   a distance determining unit configured to determine a distance between the image recording apparatus and the mobile terminal based on the signal received by the receiver;
   a range determining unit configured to determine a range, which includes the distance between the image recording apparatus and the mobile terminal, amongst a plurality of continuously incremental ranges partitioned by predetermined reference distances originating from the image recording apparatus;
   a storage configured to store information concerning a plurality of operation screens, each of which is associated with one of the plurality of continuously incremental ranges based on usability of the operation screen, the usability depending on the distance between the image recording apparatus and the mobile terminal; and
   a display controller configured to control the display device of the mobile terminal to display one of the plurality of operation screens associated with one of the plurality of continuously incremental ranges, which includes the distance between the image recording apparatus and the mobile terminal, preferentially over the remaining of the plurality of operation screens;
   wherein the image recording apparatus further comprises;
      a judging unit configured to judge whether image data provided from the mobile terminal requires an authentication process, in which a user accessing the image data is authenticated;
      an authentication unit configured to execute the authentication process when user information entered by the user through the mobile terminal and user information included in the image data are determined to be identical; and
      a record controller, which is configured to control the image recording apparatus to record the image when the judging unit judges that the image data provided from the mobile terminal requires the authentication process and after the user is authenticated in the authentication process, the record controller being configured to control the image recording apparatus to record the image without the authentication of the user when the judging unit judges that the image data provided from the mobile terminal does not require the authentication process:
   wherein, when the judging unit judges that the image data provided from the mobile terminal requires the authentication process, the display controller manipulates the display device of the mobile terminal to display an operation screen for the user to enter the user information through the mobile terminal to present as the one of the plurality of operation screens to be displayed when the distance between the image recording apparatus and the mobile terminal falls in a smallest one of the plurality of continuously incremental ranges, which includes a shortest assumable distance between the image recording apparatus and the mobile terminal:

wherein, when the receiver receives signals transmitted from a plurality of mobile terminals including the first mobile terminal, and the range determining unit determines the distances between the image recording apparatus and the plurality of mobile terminals including the first mobile terminal fall in the smallest one of the plurality of continuously incremental ranges, the recording controller controls the image recording apparatus not to start recording the image for the image data provided from the first mobile terminal until no signal that pertains to a distance that falls within the smallest one of the plurality of continuously incremental ranges from the plurality of mobile terminals, except the first mobile terminal, is received.

15. An image recording system, comprising:

an image recording apparatus configured to record an image on a recording medium;

a mobile terminal configured to wirelessly manipulate the image recording apparatus and include a display device, the mobile terminal at least including a first mobile terminal;

wherein the mobile terminal comprises:

a receiver configured to receive a signal wirelessly transmitted from the image recording apparatus;

a storage configured to store information concerning a plurality of operation screens, each of which is associated with one of a plurality of continuously incremental ranges partitioned by a predetermined reference distance originating from the image recording apparatus; and a terminal controller configured to:

determine a distance between the image recording apparatus and the mobile terminal based on the signal received by the receiver;

determine a range, which includes the distance between the image recording apparatus and the mobile terminal, amongst the plurality of continuously incremental ranges; and control the display device to display one of the plurality of operation screens associated with one of the plurality of continuously incremental ranges, which includes the distance between the image recording apparatus and the mobile terminal, wherein the image recording apparatus further comprises:

a judging unit configured to judge whether image data provided from the mobile terminal requires an authentication process, in which a user accessing the image data is authenticated;

an authentication unit configured to execute the authentication process when the user information entered by the user through the mobile terminal and user information included in the image data are determined to be identical; and a record controller, which is configured to control the image recording apparatus to record the image when the judging unit judges that the image data provided from the mobile terminal requires the authentication process and after the user is authenticated in the authentication process, the record controller being configured to control the image recording apparatus to record the image without the authentication of the user when the judging unit judges that the image data provided from the mobile terminal does not require the authentication process;

wherein, when the judging unit judges that the image data provided from the mobile terminal requires the authentication process, the terminal controller manipulates the display device of the mobile terminal to display an operation screen for the user to enter the user information through the mobile terminal to present as one of the plurality of operation screens to be displayed when the distance between the image recording apparatus and the mobile terminal falls in a smallest one of the plurality of continuously incremental ranges, which includes a shortest assumable distance between the image recording apparatus and the mobile terminal;

wherein, when the signal from the image recording apparatus is received in receivers of a plurality of mobile terminals including the first mobile terminal, and the range determining unit determines the distances between the image recording apparatus and the plurality of mobile terminals including the first mobile terminal fall in the smallest one of the plurality of continuously incremental ranges, the record controller controls the image recording apparatus not to start recording the image for the image data provided from the first mobile terminal until no determined distance within the smallest one of the plurality of continuously incremental ranges from the plurality of mobile terminals, except for the first mobile terminal, is present in a detected distance storage area.

16. The image recording system according to claim 5, wherein, in the storage, the operation screen for the user to enter at least one of the operation setting and the image recording instruction for the image recording apparatus is stored in association with at least one of the plurality of continuously incremental ranges, which is farther than the smallest one of the plurality of continuously incremental ranges originating from the image recording apparatus.

* * * * *